United States Patent
Cudak et al.

(10) Patent No.: US 10,063,589 B2
(45) Date of Patent: Aug. 28, 2018

(54) MICROCHECKPOINTING AS SECURITY BREACH DETECTION MEASURE

(71) Applicant: Lenovo Enterprise Solutions (Singapore) Pte. Ltd., Singapore (SG)

(72) Inventors: Gary David Cudak, Wake Forest, NC (US); Ajay Dholakia, Cary, NC (US); Scott Kelso, Cary, NC (US); Fred Allison Bower, III, Durham, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 204 days.

(21) Appl. No.: 15/134,327

(22) Filed: Apr. 20, 2016

(65) Prior Publication Data
US 2017/0310701 A1 Oct. 26, 2017

(51) Int. Cl.
*H04L 29/06* (2006.01)

(52) U.S. Cl.
CPC ...... *H04L 63/1441* (2013.01); *H04L 63/1458* (2013.01)

(58) Field of Classification Search
CPC .................. H04L 63/1441; H04L 63/1458
USPC .......................................................... 726/23
See application file for complete search history.

(56) References Cited

U.S. PATENT DOCUMENTS

| | | | |
|---|---|---|---|
| 9,804,927 B2 * | 10/2017 | Abali | G06F 11/1438 |
| 2002/0144129 A1 | 10/2002 | Malivanchuk et al. | |
| 2003/0229783 A1 * | 12/2003 | Hardt | G06F 21/33 |
| | | | 713/155 |
| 2005/0055559 A1 | 3/2005 | Bucher | |
| 2005/0193430 A1 * | 9/2005 | Cohen | G06F 21/577 |
| | | | 726/25 |
| 2005/0283614 A1 * | 12/2005 | Hardt | H04L 63/0823 |
| | | | 713/182 |
| 2010/0319069 A1 * | 12/2010 | Granstedt | H04L 63/0263 |
| | | | 726/22 |
| 2011/0214161 A1 * | 9/2011 | Stolfo | H04L 63/102 |
| | | | 726/4 |

(Continued)

OTHER PUBLICATIONS

Cudak et al., U.S. Appl. No. 15/134,322, filed Apr. 20, 2016.
Non-Final Office Action from U.S. Appl. No. 15/134,322, dated Dec. 15, 2017.

*Primary Examiner* — Michael S McNally
(74) *Attorney, Agent, or Firm* — Zilka-Kotab, P.C.

(57) ABSTRACT

A method includes: deploying at least one shadow system in association with each of one or more components of a network environment; periodically recording a state map of each active component of the network environment and a corresponding state map of the shadow system(s) associated therewith; periodically comparing the recorded state map of each active component with the corresponding recorded state map of the shadow system(s) associated therewith; determining whether a deviation exists with respect to the recorded state map of each active component and the corresponding recorded state map of the shadow system(s) associated therewith; determining whether the deviation is greater than a predetermined deviation threshold; and declaring a security breach regarding the active component(s) for which the deviation was determined to be greater than the predetermined deviation threshold. Corresponding systems and computer program products are also disclosed.

20 Claims, 4 Drawing Sheets

(56) References Cited

U.S. PATENT DOCUMENTS

| | | | | |
|---|---|---|---|---|
| 2012/0036577 A1* | 2/2012 | Bolzoni | ............... | H04L 43/00 |
| | | | | 726/23 |
| 2014/0244949 A1* | 8/2014 | Abali | ............... | G06F 3/065 |
| | | | | 711/162 |
| 2014/0281243 A1* | 9/2014 | Shalf | ............... | G06F 12/0813 |
| | | | | 711/122 |
| 2015/0331704 A1* | 11/2015 | Abali | ............... | G06F 9/45558 |
| | | | | 718/1 |
| 2016/0188413 A1* | 6/2016 | Abali | ............... | G06F 11/1438 |
| | | | | 714/15 |
| 2016/0378523 A1* | 12/2016 | Abali | ............... | G06F 9/467 |
| | | | | 718/1 |
| 2017/0310700 A1 | 10/2017 | Cudak et al. | | |

* cited by examiner

MICROCHECKPOINTING AS SECURITY BREACH DETECTION MEASURE

FIELD OF THE INVENTION

The present invention relates to handling security breaches of computer systems in a network environment, and more particularly, this invention relates to improving the function of network environments such as data processing clusters by detecting security breaches via microcheckpoint-based comparisons of components of the network environment.

BACKGROUND

Conventionally, a security breach in a network environment such as a compute cluster coupled to one or more other components (e.g. servers, workstations, switches, and storage devices) is detected via the use of special-purpose software that compares a library of known malware to data resident on the components of the network environment (e.g. in the case of malware or exploits) or by detecting a sudden of significant change in network behavior (e.g. traffic spike in the event of a distributed denial of service (DDOS) attack). DDOS detection conventionally involves a human element in the form of experts monitoring network behavior to determine existence of an attack.

However, these conventional approaches to detecting security breach are reactive rather than proactive, often requiring manual or scheduled execution of the specialized software or network analysis. At the time of the analysis, in order for a breach to be detected at least some damage must already have occurred, increasing the likelihood that the breach will have an opportunity to propagate to some degree to other components of the network environment in the interim.

Once a security breach is detected, typically the affected component(s) are isolated from other components of the network environment so that the breach may be addressed without further propagating to other portions of the network environment.

Conventional quarantine-based approaches to resolving security breaches generally incur performance detriments to the network environment. For instance, isolating the breached component in a quarantine renoves the component's corresponding functional contribution to the network environment, e.g. reduced processing power, memory availability, network bandwidth, storage capacity, etc., for the duration of the quarantine. Since existing techniques for detecting the particular type of breach, identifying the source and/or impact of the breach, and resolving the breach are both computationally- and time-intensive processes, the quarantine procedure can result in significant detriments to overall system performance.

In addition, processes being handled by or otherwise relying on the breached component may be compromised or lost entirely due to the breach, particularly when other, e.g. non-breached components, are dependent upon the completion of processes handled by the breached component. These losses further detriment the performance of the system as a whole.

Accordingly, it would be beneficial to provide systems, methods, computer program products and the like which avoid the problems associated with conventional approaches to detecting security breaches in a network environment.

SUMMARY

In one embodiment, a computer program product includes a computer readable medium having stored thereon computer readable program instructions. The program instructions are configured to cause a computer system to: deploy at least one shadow system in association with each of one or more components of a network environment; periodically record a state map of each active component of the network environment and a corresponding state map of the at least one shadow system associated therewith; periodically compare the recorded state map of each active component with the corresponding recorded state map of the at least one shadow system associated therewith; determine whether a deviation exists with respect to the recorded state map of each active component and the corresponding recorded state map of the at least one shadow system associated therewith; in response to determining the deviation exists, determine whether the deviation is greater than a predetermined deviation threshold; and in response to determining the deviation is greater a the predetermined deviation threshold, declare a security breach regarding the active component(s) for which the deviation was determined to be greater than the predetermined deviation threshold.

In another embodiment, a method includes: deploying at least one shadow system in association with each of one or more components of a network environment; periodically recording a state map of each active component of the network environment and a corresponding state map of the at least one shadow system associated therewith; periodically comparing the recorded state map of each active component with the corresponding recorded state map of the at least one shadow system associated therewith; determining whether a deviation exists with respect to the recorded state map of each active component and the corresponding recorded state map of the at least one shadow system associated therewith; in response to determining the deviation exists, determining whether the deviation is greater than a predetermined deviation threshold; and in response to determining the deviation is greater than the predetermined deviation threshold, declaring a security breach regarding the active component(s) for which the deviation was determined to be greater than the predetermined deviation threshold.

In yet another embodiment, a system includes a processor configured to: deploy at least one shadow system in association with each of one or more components of a network environment; periodically record a state map of each active component of the network environment and a corresponding state map of the at least one shadow system associated therewith; periodically compare the recorded state map of each active component with the corresponding recorded state map of the at least one shadow system associated therewith; determine whether a deviation exists with respect to the recorded state map of each active component with and the corresponding recorded state map of the at least one shadow system associated therewith; in response to determining the deviation exists, determine whether the deviation is greater than a predetermined deviation threshold; and in response to determining the deviation is greater than the predetermined deviation threshold, declare a security breach regarding the active component(s) for which the deviation was determined to be greater than the predetermined deviation threshold.

Other aspects and advantages of the present invention will become apparent from the following detailed description, which, when taken in conjunction with the drawings, illustrate by way of example the principles of the invention.

DETAILED DESCRIPTION

Figure 1:
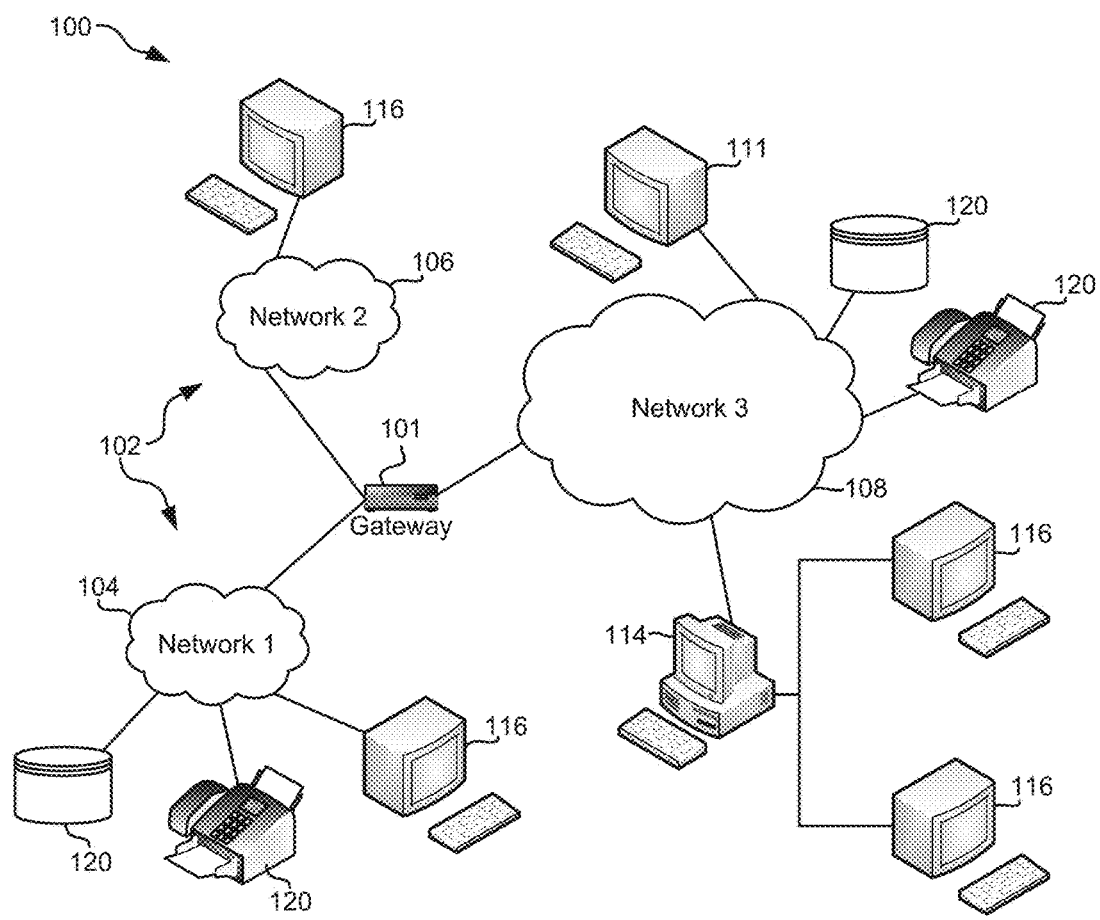
FIG. 1 is a schematic drawing of a computer network environment, according to one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a computer program product includes a computer readable medium having stored thereon computer readable program instructions. The program instructions are configured to cause a computer system to: deploy at least one shadow system in association with each of one or more components of a network environment; periodically record a state map of each active component of the network environment and a corresponding state map of the at least one shadow system associated therewith; periodically compare the recorded state map of each active component with the corresponding recorded state map of the at least one shadow system associated therewith; determine whether a deviation exists with respect to the recorded state map of each active component and the corresponding recorded state map of the at least one shadow system associated therewith; in response to determining the deviation exists, determine whether the deviation is greater than a predetermined deviation threshold; and in response to determining the deviation is greater than the predetermined deviation threshold, declare a security breach regarding the active component(s) for which the deviation was determined to be greater than the predetermined deviation threshold.

In another general embodiment, a method includes: deploying at least one shadow system in association with each of one or more components of a network environment; periodically recording a state map of each active component of the network environment and a corresponding state map of the at least one shadow system associated therewith; periodically comparing the recorded state map of each active component with the corresponding recorded state map of the at least one shadow system associated therewith; determining whether a deviation exists with respect to the recorded state map of each active component and the corresponding recorded state map of the at least one shadow system associated therewith; in response to determining the deviation exists, determining whether the deviation is greater than a predetermined deviation threshold; and in response to determining the deviation is greater than the predetermined deviation threshold, declaring a security breach regarding the active component(s) for which the deviation was determined to be greater than the predetermined deviation threshold.

In yet another general embodiment, a system includes a processor configured to: deploy at least one shadow system in association with each of one or more components of a network environment; periodically record a state map of each active component of the network environment and a corresponding state map of the at least one shadow system associated therewith; periodically compare the recorded state map of each active component with the corresponding recorded state map of the at least one shadow system associated therewith; determine whether a deviation exists with respect to the recorded state map of each active component with and the corresponding recorded state map of the at least one shadow system associated therewith; in response to determining the deviation exists, determine whether the deviation is greater than predetermined deviation threshold; and in response to determining the deviation is greater than the predetermined deviation threshold, declare a security breach regarding the active component(s) for which the deviation was determined to be greater than the predetermined deviation threshold.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." in cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
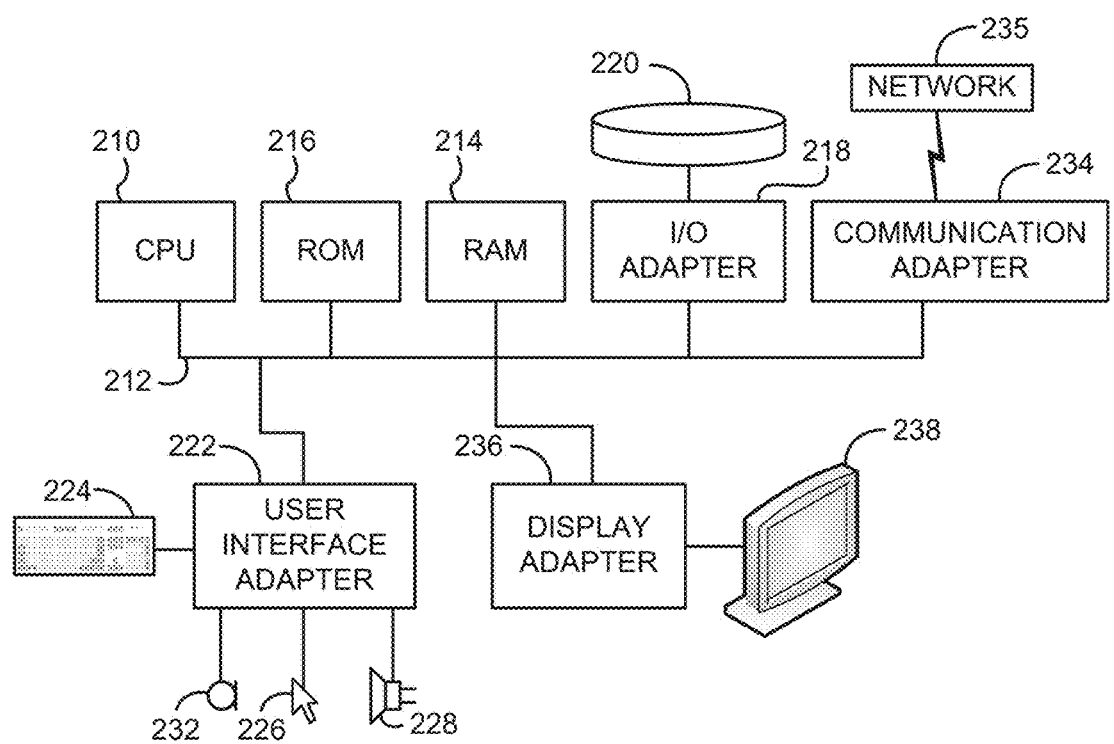
FIG. 2 depicts a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
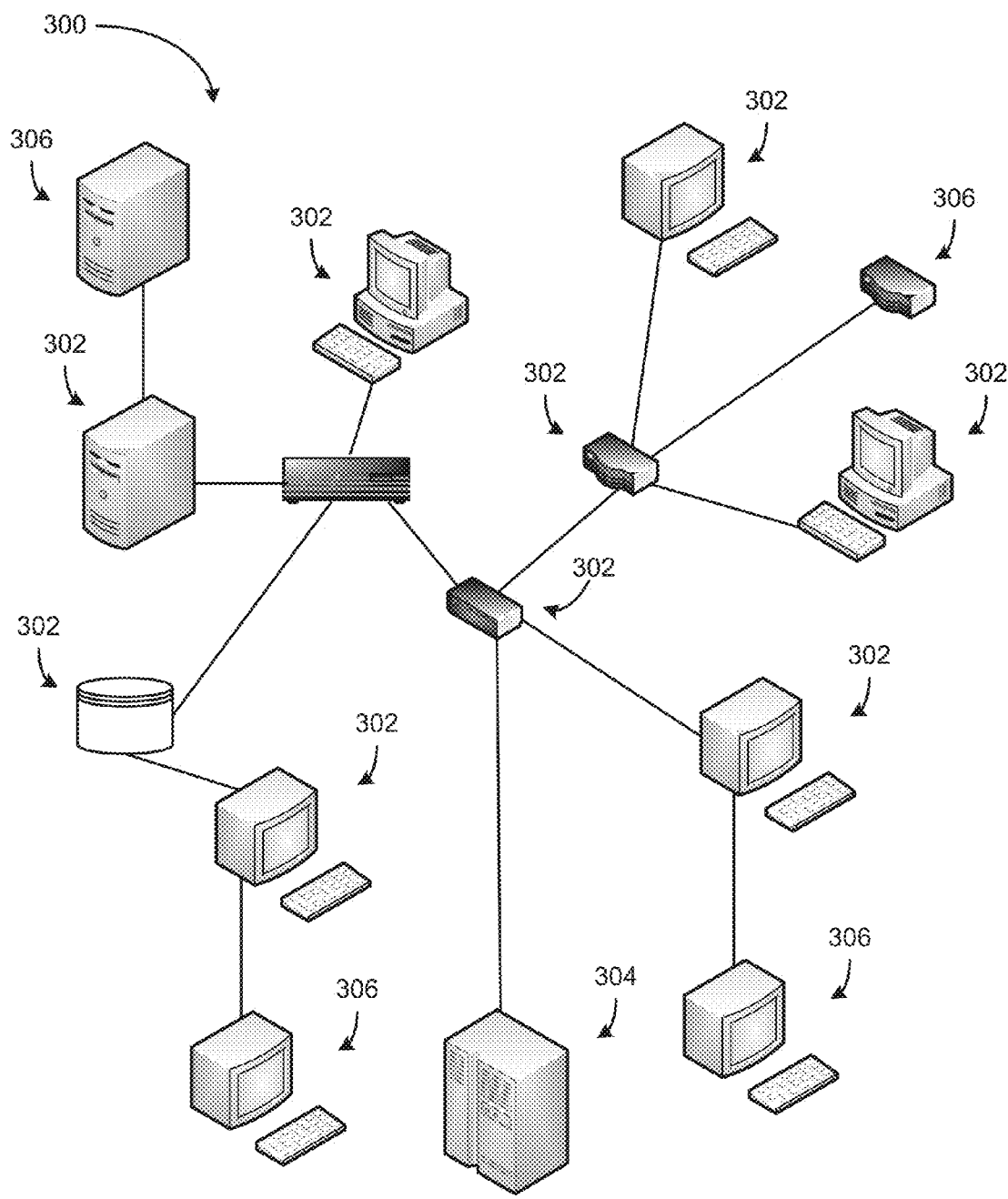
FIG. 3 depicts an exemplary network environment, according to one embodiment.

In one embodiment, and as shown in FIG. 3, the presently disclosed inventive concepts may be implemented in a network environment 300 such as a compute cluster, a storage area network (SAN), a LAN, a WAN, or any other suitable environment including a plurality of components 302 (preferably hardware components but optionally including one or more virtualized components in various embodiments) communicatively coupled to a server 304 such as a management server.

In one approach, the architecture 100 shown in FIG. 1 may be considered an illustrative embodiment of a network environment 300, and/or the representative hardware environment shown in FIG. 2 may be considered an exemplary embodiment of a hardware component 302 and/or server 304.

The network environment 300 includes a plurality of components 302, which may include one or more of servers, routers, switches, data storage devices, compute nodes (preferably including a memory and a processor or processors), workstations, bridges, etc. as would be understood by a person having ordinary skill in the art upon reading the present descriptions.

In general, and according to preferred embodiments, the server 304 is a management server configured to survey the components 302 of the network environment 300, determine configuration information for the various components 302, and build profile(s) for different component types. In various embodiments, component types may include compute components (e.g. data processing nodes or clusters, workstations, etc.), management components (e.g. filesystem servers, web servers, etc.), networking components (e.g. switches, routers, bridges, ports, etc.), storage components (e.g. HDD-based storage, SSD-based storage, tape-based storage, memory-based storage, etc.), or any other suitable type of component for inclusion in various different types of network architectures. In more approaches, component types may be defined or determined based on a unique context of the network environment 300.

Components of the network environment may advantageously be characterized by having associated therewith one or more redundant "shadow" components 306, which enables the inventive and advantageous maintenance of network environment performance in event of a potential security breach while simultaneously isolating the affected component(s) 302 to avoid propagating the breach or detrimental impact thereof.

As understood herein, a shadow system is a component essentially identical or functionally equivalent to a corresponding component of the network environment, but which is not directly accessible or visible to the network environment for purposes of performing workloads. In this manner, the shadow systems are isolated from potential security breaches because the origin of the potential breach is not capable of enacting a breach on the shadow system, in preferred approaches.

Skilled artisans will appreciate, upon reading these disclosures, that it is desirable in some embodiments to maintain a degree of independence between shadow systems and corresponding components of the network environment (e.g. a predetermined distance between IP addresses assigned to the component(s) and corresponding shadow system(s)), so as to minimize the likelihood of a breach targeting a component to "spill-over" to the associated shadow system due to proximity between the two. In certain embodiments, the amount of distance necessary or sufficient to accomplish adequate independence may be defined by a user, e.g. an administrator or owner of the network environment, based in whole or in part on an amount of risk the network environment may tolerate.

Preferably, to facilitate accurate identification of actual security breaches and minimize false positive reports, the one or more components and corresponding shadow systems are characterized by identical capabilities with respect to performing workloads. For instance, the component(s) and corresponding shadow system(s) may have allocated thereto an identical amount of processing resources, e.g. processor speed, memory allocation, data storage, etc.; an identical network configuration, e.g. access to the same or a functionally equivalent set of networked components and/or network resources, etc. as would be understood by a person having ordinary skill in the art upon reading the present disclosures.

In more embodiments, the one or more component(s) and corresponding shadow system(s) may include functionally equivalent or identical virtual machines, virtual switches, etc.

Figure 4:
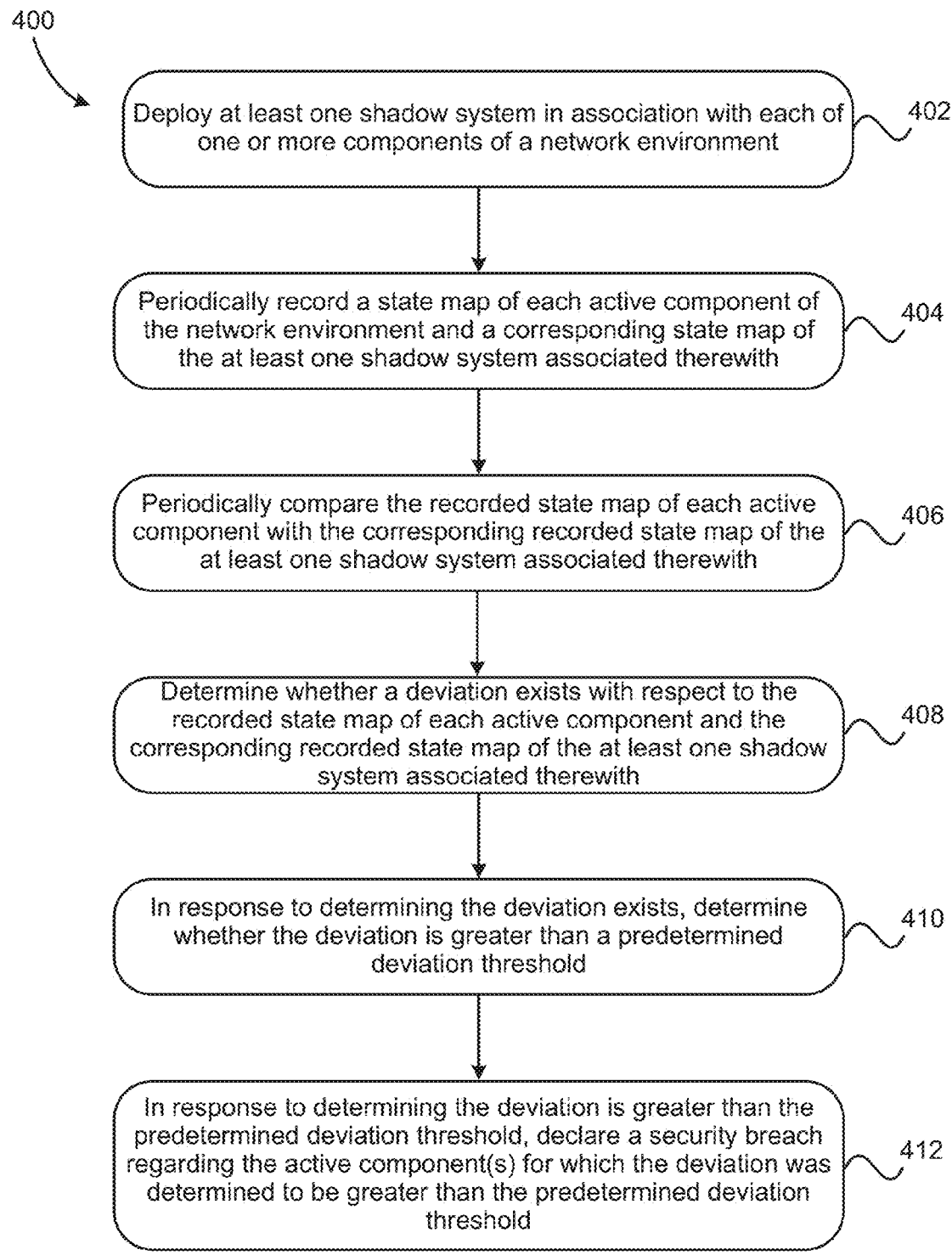
FIG. 4 shows a flowchart of a method, according to one approach.

Now referring to FIG. 4, a flowchart of a method 400 is shown according to one embodiment. The method 400 may be performed in accordance with the present invention in any of the environments depicted in FIGS. 1-3 among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a management server of a network environment, or some other device having one or more processors therein such as a cluster. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where at least one shadow system is deployed in association with each of one or more components of a network environment. Preferably, the one or more components are active components, or components likely to become active based on workload distribution across the network environment.

In various approaches, shadow deployment and/or number of shadows deployed may be determined based on a risk tolerance of the network environment, which may in turn be based on a service level agreement associated with the network environment, customer, etc. Additionally and/or alternatively, attributes of the workload being handled by the component(s) may determine whether, and if so how many, shadows are deployed. Exemplary attributes may include a type or version of an application to which the workload relates, customer associated with the workload, etc. as would be understood by a person having ordinary skill in the art upon reading the instant descriptions.

Method 400 also includes operation 404, in which a state map of each active component of the network environment and a corresponding state map of the at least one shadow system associated therewith are periodically recorded. As understood herein, components are considered "active" when exposed to outside sources of a potential security breach, when actively processing a workload, or both, in various embodiments.

In preferred approaches, state map determinations may utilize a joint test action group (JTAG) port present on the active component(s), shadow systems associated therewith, and/or hardware hosting the active components and/or shadow systems (e.g. in the case of virtualized active components and shadow systems). In some embodiments, there may be a third component, e.g. an external monitoring component, configured to receive state map information from JTAG ports and perform comparisons as discussed herein.

Method 400 accordingly further includes periodically comparing the recorded state map of each active component with the corresponding recorded state map of the at least one shadow system associated therewith in operation 406.

In various embodiments, the period between recording state maps and/or comparing state maps of the active component(s) against the state maps of corresponding shadow system(s) may be determined based on the type of application(s) and/or workload(s) being handled by the network environment, in some approaches.

For example, a network environment handling microtransactions, e.g. for trading on an exchange, in which transactions may occur on a microsecond or nanosecond scale will benefit from a shorter period (e.g. recording and/or comparing on a millisecond scale, such as every hundred milliseconds or several hundred milliseconds), than a network environment hosting a web server may record and/or perform comparisons on a longer time scale (e.g. minute or hour scale) to minimize overhead associated with recording and comparing state maps.

In more embodiments, frequency of recording and/or comparing state maps may be determined based on an amount of time or exposure the active component will be potentially vulnerable to security breaches, e.g. via exposure to systems or processes entering the network environment from other points of origin. For instance, the period between recording and/or comparing state maps may be on a minute scale for exposure times of one hour or less, tens of minutes for exposure times of more than one hour but less than one day, and on an hourly scale for exposure times of one day or more, in various embodiments.

In approaches where independence between shadow systems and associated active components is particularly desirable, it is advantageous to perform comparisons of state maps with a frequency on the scale of a per-second to per-minute basis. Advantageously, allowing a gap between comparisons of seconds to minutes reduces the likelihood that a single security breach will be applied to/reflected in both the active component and the security system, in which case detecting the security breach would be much more difficult.

In operation 408, a determination is made as to whether a deviation exists with respect to the recorded state map of each active component with the corresponding recorded state map of the at least one shadow system associated therewith. Preferably, the deviation is measured according to one or more of performance metrics and configuration settings, e.g. virtual machine configuration, network accessibility configuration for the component, etc.

As will be understood by a person having ordinary skill in the art upon reading the instant disclosures, potential security breach detection may be based on detecting anomalies, e.g. deviations from performance patterns, configuration states, etc. as mentioned above. The identification of an anomaly may be an internal determination, based on comparing component performance/configuration to prior, stable performance/configuration information, in one approach.

In another approach, potential security breaches may be detected based in whole or in part on information determined from an external monitoring component. For example, a network monitor may observe network traffic and detect an attack or an exploit either emanating from or targeted at a particular system or subsystem. Preferably, the monitor is external in that the monitor engages in passive observation of components of the network environment, rather than a component tracking its own performance or configuration over time to determine deviations. This passive observation makes the monitor a less likely target for security breaches than the active components of the network environment, facilitating security breach detection, in some approaches.

In even more approaches, the external monitor may include a trusted entity or component which has awareness of identity of various components of the network environment which do not have direct awareness of each other's identity. In this embodiment, the external monitor acts as a trusted broker to ensure appropriate passage of information between components, restoration of components to a particular state, etc. For instance, in one approach upon detecting a potential security breach, in order to restore the affected component(s) to a known good working state, the external monitor may broker the transmission of configuration settings, firmware, etc. between a source and the affected component to ensure the restoration will be successful and will not propagate the breach to other components of the system and/or propagate a second breach to the affected component(s).

In response to determining a deviation exists with respect to the recorded state map of each active component with the corresponding recorded state map of the at least one shadow system associated therewith, a determination is made as to whether the deviation is greater than a predetermined deviation threshold, in operation 410 of method 400.

The predetermined deviation threshold may be based on the type of workload(s) being handled by the active component, a service level agreement for a customer to which the workloads correspond, a predetermined risk tolerance level for the network environment, a value set by a manufacturer or installer, etc. as would be understood by a person having ordinary skill in the art upon reading the present descriptions.

In response to determining the deviation is greater than the predetermined deviation threshold, in operation 412 of method 400 a security breach is declared regarding the active component(s) for which the deviation was determined to be greater than the predetermined deviation threshold.

Of course, as noted above, method 400 may include one or more additional and/or alternative operations, features, functions, etc. For instance, in various approaches, method 400 may additionally and/or alternatively include any combination of the following.

In one instance, the method 400 may include determining the restorable state via one or more of evaluating one or more microcheckpoints corresponding to the at least one component; and verifying an operating status of the at least one component for the one or more micro-checkpoints. Accordingly, recording the state maps comprises a microcheckpointing process configured to determine and log the state map of each active component of the network environment and the corresponding state map of the at least one shadow system associated therewith. For instance, microcheckpointing may be performed on a per packet encryption basis, per page processed, per I/O operation, per component, may operate on artifacts, etc. as would be understood by a person having ordinary skill in the art upon reading the present disclosures.

In order to facilitate detection of deviations between the active components and associated shadow system(s), in various approaches duplicate inputs are provided to each pair/set of active component and associated shadow systems. The inputs are duplicate in the sense that each system is tasked with processing the same amount of data and type of workload, essentially mirroring performance between the two or more systems. Since the shadow systems are functionally equivalent or identical to the associated active component, processing duplicate workloads/tasks enables a one-to-one comparison of system performance, configuration, etc. facilitates accurate detection of potential security breaches, especially in combination with a microcheckpoint-based logging of performance and/or configuration information.

In various embodiments, verifying operating status of the component(s) may be accomplished using any suitable technique, tool, etc. that would be appreciated by a person having ordinary skill in the art upon reading the present descriptions. Preferably, the verification process, if associated with overhead comparable to conventional malware or other breach detection techniques, may be performed at a later time, e.g. during non-peak hours, in order to minimize the impact on the network environment as a whole. Even more preferably, where verification is delayed, a failover approach is used to minimize performance impact of the potential breach on the network environment.

In one approach, a Bloom filter data structure may be implemented to facilitate detection of security breaches, e.g. via detecting deviations as disclosed herein. As will be appreciated by persons having ordinary skill in the art upon reading the instant disclosures, using a Bloom filter is an attractive approach to detecting potentially serious problems associated with security breach because Bloom filters are characterized by the property that while false positive results may occur, no false negative events are possible. Accordingly, using a Bloom filter ensures that, while some declared security breaches may in fact be caused by other factors (e.g. network latency, natural "drift" between shadow systems and associated active components, hardware failure, etc.), anomalies associated with security breach will not be missed. This is a particularly advantageous embodiment since security breaches may cause extensive damage, exposure of confidential and/or proprietary information, etc.

In preferred approaches extraneous sources of potential deviation but which are not necessarily indicative of a security breach are also taken into account, e.g. network latency, differences in time of initiating workload execution, differences in type of code being executed, differences in clocking mechanisms between components, etc. as would be understood by a person having ordinary skill in the art upon reading the instant descriptions. Thus, isolating the synchronicity evaluation to deviations that arise solely due to differential performance of the component(s) and corresponding shadow system(s) facilitates identification of true security breaches as opposed to deviations resulting from other sources of performance impact.

Moreover, determining whether the deviation exists may be based at least in part on comparing one or more performance metrics of the one or more shadow systems and the associated active component. The one or more performance metrics are preferably selected from a group consisting of: execution time associated with performing the mirrored version of the one or more workloads and the one or more workloads, progress of the mirrored version of the one or more workloads relative to progress of the one or more workloads; memory usage associated with performing the mirrored version of the one or more workloads and the one or more workloads, network behavior associated with performing the mirrored version of the one or more workloads and the one or more workloads.

For example, if a component performing a workload or workloads and a shadow system performing a corresponding, mirrored version of the workload(s) exhibit a deviation in execution time, memory usage, or network behavior, this may be indicative of a potential security breach because the security breach may be consuming additional processing resources, causing differential memory utilization, and/or causing differential network behavior (e.g. the potentially breached component(s) accessing different and/or more resources of the network environment than the shadow system(s)). In one embodiment, where execution time and/or workload progress are employed as the metric, a deviation on the order of milliseconds may be considered indicative of a potential security breach.

Restoring the components operation within the network may additionally and/or alternatively include resetting accessible infrastructure within the network environment.

In various embodiments, resetting accessible infrastructure may include resetting switch configuration files to a default configuration, and/or a configuration corresponding to a point in time prior to the potential security breach. In more approaches, resetting accessible infrastructure may include resetting firmware associated with one or more components of the network environment, preferably including the at least one component for which the potential security breach was detected. In still more embodiments, resetting accessible infrastructure may include resetting virtual machine configuration settings to a default configuration, and/or a configuration corresponding to a point in time prior to the potential security breach.

As mentioned above, maintaining network environment functionality and performance may advantageously include implementing a failover of workloads handled by the at least one component to one or more corresponding shadow systems of the network environment.

Failover, in various approaches, may include making the shadow system accessible to other components of the network environment, such that the shadow system effectively replaces the potentially breached component to allow workload processing to continue with minimal interruption. Failover may thus include configuring the shadow system, e.g. in terms of network connectivity, network identity/location (for instance component ID, domain name lookup, IP address, etc), or any other suitable configuration of parameters that would be understood by a person having ordinary skill in the art upon reading the present disclosure.

Similarly, to restore redundancy, upon resolving the potential breach the component(s) for which workloads were failed-over to the corresponding shadow systems may be reinstated, and/or serve as shadow systems to the component handling the failed-over workload, in several embodiments.

Failover is a particularly attractive solution to security breaches such as distributed denial of service (DDOS) attacks which continuously impact the performance of a particular component or components of a network environment.

As will be understood by those having ordinary skill in the art upon reading the instant descriptions, any feature or functionality disclosed herein may be optionally implemented in a computer program product. According to these embodiments, a computer program product may include a computer readable medium having stored thereon computer readable program instructions configured to cause a processor of a computer system to: determine a configuration of one or more networked hardware components; determine a usage level associated with one or more of the networked hardware components; and determine a functional category of one or more of the networked hardware components based at least in part on the configuration of the one or more networked hardware components and the usage level associated with the one or more networked hardware components.

Of course the computer program product may additionally and/or alternatively include any combination of functions or features as described herein, in more approaches.

By implementing the aforementioned techniques, features, and components, in various embodiments, the presently disclosed inventive concepts advantageously improve the function of network environments and associated systems by resolving security breaches without incurring the overhead and potential loss associated with implementing a quarantine and resolving the security breach using conventional techniques. By leveraging much faster and computationally efficient roll-back techniques, the security breach may be resolved without utilizing time and resources associated with searching an entire system for the origin and/or cause of the breach and subsequently resolving the breach.

Moreover, the implementation of microcheckpoint-based security breach detection improves the function of network environments by facilitating rapid and precise identification of anomalies associated with security breaches, attempted security breaches, etc. Indeed, the fine granularity of microcheckpointing offers a rapid-response paradigm compared to conventional malware and DDOS or other similar attack detection measures. Accordingly, network environment security may be improved by reducing the frequency and extent of breach propagation through the network environment by employing the presently disclosed inventive concepts.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product, comprising: a non-transitory computer readable medium having stored thereon computer readable program instructions configured to cause a computer system to:
   deploy at least one shadow system in association with each of one or more components of a network environment;
   periodically record a state map of each active component of the network environment and a corresponding state map of the at least one shadow system associated therewith;
   periodically compare the recorded state map of each active component with the corresponding recorded state map of the at least one shadow system associated therewith;
   determine whether a deviation exists with respect to the recorded state map of each active component and the corresponding recorded state map of the at least one shadow system associated therewith;
   in response to determining the deviation exists, determine whether the deviation is greater than a predetermined deviation threshold;
   in response to determining the deviation is greater than the predetermined deviation threshold, declare a security breach regarding the active component(s) for which the deviation was determined to be greater than the predetermined deviation threshold; and
   replace the active component with one of the at least one shadow systems associated therewith in response to declaring the security breach.

2. The computer program product as recited in claim 1, wherein recording the state maps comprises a microcheckpointing process configured to determine and log the state map of each active component of the network environment and the corresponding state map of the at least one shadow system associated therewith.

3. The computer program product as recited in claim 1, comprising providing duplicate inputs to the at least one shadow system as the inputs provided to the active component with which the at least one shadow system is associated.

4. The computer program product as recited in claim 1, wherein determining whether the deviation exists is based at least in part on comparing one or more performance metrics of the at least one shadow system and the active component with which the at least one shadow system is associated.

5. The computer program product as recited in claim 4, wherein the one or more performance metrics are selected from a group consisting of:
   execution time associated with performing one or more duplicate workloads on the active component and the shadow system associated therewith;
   progress of the one or more duplicate workloads on the active component and the shadow system associated therewith;
   memory usage associated with performing one or more duplicate workloads on the active component and the shadow system associated therewith; and
   network behavior associated with performing the one or more duplicate workloads on the active component and the shadow system associated therewith.

6. The computer program product as recited in claim 1, wherein determining whether the deviation exists employs a Bloom filter.

7. The computer program product as recited in claim 1, wherein determining whether the deviation exists is based at least in part on comparing one or more performance metrics of the at least one shadow system and the active component with which the at least one shadow system is associated; and wherein the one or more performance metrics are selected from a group consisting of:
   an execution time associated with performing one or more duplicate workloads on the active component and the shadow system associated therewith;
   a progress of the one or more duplicate workloads on the active component and the shadow system associated therewith;
   a memory usage associated with performing one or more duplicate workloads on the active component and the shadow system associated therewith; and
   a network behavior associated with performing the one or more duplicate workloads on the active component and the shadow system associated therewith.

8. A method, comprising:
   deploying at least one shadow system in association with each of one or more components of a network environment;
   periodically recording a state map of each active component of the network environment and a corresponding state map of the at least one shadow system associated therewith;

periodically comparing the recorded state map of each active component with the corresponding recorded state map of the at least one shadow system associated therewith;

determining whether a deviation exists with respect to the recorded state map of each active component and the corresponding recorded state map of the at least one shadow system associated therewith;

in response to determining the deviation exists, determining whether the deviation is greater than a predetermined deviation threshold;

in response to determining the deviation is greater than the predetermined deviation threshold, declaring a security breach regarding the active component(s) for which the deviation was determined to be greater than the predetermined deviation threshold; and replacing the active component with one of the at least one shadow systems associated therewith in response to declaring the security breach.

9. The method as recited in claim 8, wherein recording the state maps comprises a microcheckpointing process configured to determine and log the state map of each active component of the network environment and the corresponding state map of the at least one shadow system associated therewith.

10. The method as recited in claim 8, comprising providing duplicate inputs to the at least one shadow system as the inputs provided to the active component with which the at least one shadow system is associated.

11. The method as recited in claim 8, wherein determining whether the deviation exists is based at least in part on comparing one or more performance metrics of the at least one shadow system and the active component with which the at least one shadow system is associated.

12. The method as recited in claim 11, wherein the one or more performance metrics are selected from a group consisting of:
  execution time associated with performing one or more duplicate workloads on the active component and the shadow system associated therewith;
  progress of the one or more duplicate workloads on the active component and the shadow system associated therewith;
  memory usage associated with performing one or more duplicate workloads on the active component and the shadow system associated therewith; and
  network behavior associated with performing the one or more duplicate workloads on the active component and the shadow system associated therewith.

13. The method as recited in claim 8, wherein determining whether the deviation exists employs a Bloom filter.

14. A system, comprising a hardware processor configured to:
  deploy at least one shadow system in association with each of one or more components of a network environment;
  periodically record a state map of each active component of the network environment and a corresponding state map of the at least one shadow system associated therewith;
  periodically compare the recorded state map of each active component with the corresponding recorded state map of the at least one shadow system associated therewith;
  determine whether a deviation exists with respect to the recorded state map of each active component with and the corresponding recorded state map of the at least one shadow system associated therewith;
  in response to determining the deviation exists, determine whether the deviation is greater than a predetermined deviation threshold; and
  in response to determining the deviation is greater than the predetermined deviation threshold, declare a security breach regarding the active component(s) for which the deviation was determined to be greater than the predetermined deviation threshold.

15. The system as recited in claim 14, wherein recording the state maps comprises a microcheckpointing process configured to determine and log the state map of each active component of the network environment and the corresponding state map of the at least one shadow system associated therewith.

16. The system as recited in claim 14, wherein the processor is configured to provide duplicate inputs to the at least one shadow system as the inputs provided to the active component with which the at least one shadow system is associated.

17. The system as recited in claim 14, wherein determining whether the deviation exists is based at least in part on comparing one or more performance metrics of the at least one shadow system and the active component with which the at least one shadow system is associated.

18. The system as recited in claim 17, wherein the one or more performance metrics are selected from a group consisting of:
  execution time associated with performing one or more duplicate workloads on the active component and the shadow system associated therewith;
  progress of the one or more duplicate workloads on the active component and the shadow system associated therewith;
  memory usage associated with performing one or more duplicate workloads on the active component and the shadow system associated therewith; and
  network behavior associated with performing the one or more duplicate workloads on the active component and the shadow system associated therewith.

19. The system as recited in claim 14, wherein determining whether the deviation exists employs a Bloom filter.

20. The system as recited in claim 14, wherein the processor is configured to replace the active component with one of the at least one shadow systems associated therewith in response to declaring the security breach.

* * * * *